United States Patent
Alman (10) Patent No.: US 9,915,374 B2
(45) Date of Patent: Mar. 13, 2018

(54) VALVE STEM AND PLUG CONNECTIONS AND STAKING TOOLS

(71) Applicant: FISHER CONTROLS INTERNATIONAL LLC, Marshalltown, IA (US)

(72) Inventor: Paul Taylor Alman, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 111 days.

(21) Appl. No.: 14/958,605

(22) Filed: Dec. 3, 2015

(65) Prior Publication Data

US 2016/0238154 A1 Aug. 18, 2016

Related U.S. Application Data

(63) Continuation of application No. 14/957,992, filed on Dec. 3, 2015.
(Continued)

(51) Int. Cl.
*B21J 15/48* (2006.01)
*F16K 31/50* (2006.01)
(Continued)

(52) U.S. Cl.
CPC .......... *F16K 31/508* (2013.01); *B23P 15/001* (2013.01); *B25B 27/24* (2013.01);
(Continued)

(58) Field of Classification Search
CPC ....... B21D 19/12; B25B 27/023; B25B 27/24; B23P 15/001; B23P 15/002; F16K 31/508; B21J 13/06; B21J 15/48
See application file for complete search history.

(56) References Cited

U.S. PATENT DOCUMENTS 2,485,954 A * 10/1949 Burrell ............... F16B 39/02
29/243.5
3,101,210 A 8/1963 Johnson
(Continued)

FOREIGN PATENT DOCUMENTS

| JP | S4820814 | 6/1973 |
| JP | H09287669 | 11/1997 |
| WO | 03033928 | 4/2003 |

OTHER PUBLICATIONS

Invitation to Pay Additional Fees and, Where Applicable, Protest Fee and Communication Relating to the Results of the Partial International Search, issued by the International Searching Authority in connection with International patent application No. PCT/US2016/017445, dated May 18, 2016, 8 pages.
(Continued)

*Primary Examiner* — Edward Tolan
(74) *Attorney, Agent, or Firm* — Hanley, Flight & Zimmerman, LLC (57) ABSTRACT

Example valve stem and plug connections and example staking tools are described herein. An example apparatus includes a valve plug having a first side, a second side opposite the first side and a bore extending from the first side to the second side. A first portion of the bore is tapered from a first diameter to a second diameter smaller than the first diameter. A valve stem is disposed within the bore of the valve plug. The valve stem includes a first section, a second section and a third section between the first and second sections. The third section is tapered from a third diameter to a fourth diameter smaller than the third diameter. The tapers of the first portion of the valve plug and the third section of the valve stem, when engaged, create a frictional force that resists movement of the valve stem out of the bore.

20 Claims, 9 Drawing Sheets

Related U.S. Application Data (60) Provisional application No. 62/115,383, filed on Feb. 12, 2015.

(51) Int. Cl.

| | | |
|---|---|---|
| *F16K 1/36* | (2006.01) | |
| *F16K 1/48* | (2006.01) | |
| *B23P 15/00* | (2006.01) | |
| *B25B 27/24* | (2006.01) | |
| *F16B 39/02* | (2006.01) | |
| *F16B 39/04* | (2006.01) | |
| *F16B 41/00* | (2006.01) | |
| *F16B 4/00* | (2006.01) | |

(52) U.S. Cl.
CPC ............ *F16B 39/025* (2013.01); *F16B 39/04* (2013.01); *F16B 41/002* (2013.01); *F16K 1/36* (2013.01); *F16K 1/48* (2013.01); *F16K 1/487* (2013.01); *B21J 15/48* (2013.01); *F16B 4/004* (2013.01)

(56) References Cited

U.S. PATENT DOCUMENTS

| | | | | |
|---|---|---|---|---|
| 3,519,245 | A | | 7/1970 | Hyde |
| 3,719,345 | A | * | 3/1973 | Bridegum ............... F16L 41/08 |
| | | | | 251/351 |
| 3,984,904 | A | * | 10/1976 | Schlecht ................ B23P 15/10 |
| | | | | 264/269 |
| 4,274,433 | A | | 6/1981 | Schnall |
| 4,614,014 | A | * | 9/1986 | Ferguson .............. B23P 15/001 |
| | | | | 251/367 |
| 5,174,018 | A | * | 12/1992 | Muller ................. B23P 19/062 |
| | | | | 29/243.517 |
| 5,423,645 | A | * | 6/1995 | Muller ................. B23P 19/062 |
| | | | | 411/113 |
| 5,509,290 | A | * | 4/1996 | Faivre ................. B21D 39/031 |
| | | | | 29/21.1 |
| 2003/0074792 | A1 | | 4/2003 | Baumann |
| 2012/0298225 | A1 | | 11/2012 | Nguyen |

OTHER PUBLICATIONS

United States Patent and Trademark Office, "Non-Final Office Action," issued in connection with U.S. Appl. No. 14/957,992, dated Jun. 15, 2017, 21 pages.

United States Patent and Trademark Office, "Final Office Action," issued in connection with U.S. Appl. No. 14/957,992, dated Aug. 25, 2017, 25 pages.

\* cited by examiner

VALVE STEM AND PLUG CONNECTIONS AND STAKING TOOLS

RELATED APPLICATIONS

This patent arises from a continuation of U.S. application Ser. No. 14/957,992, titled "VALVE STEM AND PLUG CONNECTIONS AND STAKING TOOLS," filed Dec. 3, 2015, which claims the benefit under 35 U.S.C. § 119(e) to U.S. Provisional Application No. 62/115,383, titled "VALVE STEM AND PLUG CONNECTIONS AND STAKING TOOLS," filed Feb. 12, 2015. U.S. application Ser. No. 14/957,992, and U.S. Provisional Application 62/115,383 are incorporated herein by this reference in their entireties.

FIELD OF THE DISCLOSURE

This disclosure relates generally to valves and, more particularly, to valve stem and plug connections and staking tools.

BACKGROUND

Control valves are commonly used in process control systems such as, for example, for controlling product flow in a food processing plant, for maintaining fluid levels in large tank farms, etc. Control valves are used to manage the product flow or to maintain the fluid levels by functioning like a variable passage. The amount of fluid flowing through a valve body of the control valve can be accurately controlled by precise movement of a valve plug (e.g., a valve member) disposed within the valve body. In some known automated control values, such as sliding stem valves (e.g., a gate valve, a globe valve, a diaphragm valve, a pinch valve, etc.), a valve stem operatively couples the valve plug to an actuator. The actuator moves the valve plug within the valve body relative to a seat ring between an open position and a closed position to allow or restrict the flow of fluid between an inlet and an outlet of the valve. The valve stem is connected to the valve plug at an opening of the valve plug and is oriented perpendicular to the valve plug. The alignment between the valve stem and the valve plug is an important factor in ensuring proper sealing interaction between the valve plug and seat ring and achieving tight shut-off performance.

In some known control valves, the valve stem is connected to the valve plug via threads at a threaded opening of the valve plug. However, the tolerances between the threads on the valve stem and threaded opening often result in misalignment. Additionally, the valve stem is typically non-rotatably fixed to the valve plug by using a drive pin, which can cause misalignment between the valve stem and the valve plug and affect the integrity of the valve plug.

Other known control valves use a valve stem having a neck or sharp bevel to assist in aligning the valve stem with the opening in the valve plug. However, manufacturing such a profile requires removing material from a stem stock and, thus, creates weaker sections in the valve stem. Additionally, the neck creates an area where forces tend to concentrate and affect the strength of the valve stem. Further, when known valves are exposed to high temperatures and/or high vibrations, the valve stem can become worn and loosen within the opening of the valve plug. As a result, valve stem and plug connections become misaligned and, thus, require maintenance or replacement.

SUMMARY

An example apparatus disclosed herein includes a valve plug having including a first side, a second side opposite the first side and a bore extending from the first side to the second side. A first portion of the bore is tapered from a first diameter to a second diameter smaller than the first diameter. The example apparatus also includes a valve stem disposed within the bore of the valve plug. The valve stem includes a first section, a second section and a third section between the first and second sections. The third section is tapered from a third diameter to a fourth diameter smaller than the third diameter. The third section of the valve stem is engaged with the first portion of the bore. The tapers of the first portion of the valve plug and the third section of the valve stem create a frictional force that resists movement of the valve stem out of the bore.

Another example apparatus disclosed herein includes a plug to be disposed in a valve body to control a flow of fluid therethrough. The plug has a first side, a second side opposite the first side and a channel extending between the first side and the second side. The channel has a first diameter at the first side and a second diameter at the second side. The second diameter is smaller than the first diameter. A first portion of the channel is tapered at about 1.5° between the first diameter and the second diameter. The example apparatus also includes a stem that is to be inserted into the channel of the plug. The stem has a first section, a second section at or near an end of the stem and a third section between the first and second sections. The first section has a third diameter, the second section has a fourth diameter less than the third diameter and the third section is tapered at about 1.5° between the third diameter and the fourth diameter.

An example disclosed herein includes inserting a valve stem into a central opening in a valve plug. The central opening extends between a first side and a second side of the valve plug. A portion of the central opening is a tapered from a first diameter to a second diameter smaller than the first diameter. In the example method, the valve stem has a first section, a second section at or near an end of the valve stem and a third section between the first and second sections. The third section is tapered between a third diameter and a fourth diameter smaller than the third diameter. When the valve stem is inserted into the central opening, the third section of the valve stem engages the portion of the central opening being tapered and creates a frictional force that resists movement of the valve stem out of the central opening. The example method also includes coupling the valve stem to the valve plug.

An example staking tool disclosed herein includes a body having a first side and a second side opposite the first side and an extension projecting outward from the second side of the body. The extension has a smaller diameter than the body, and the extension has an end surface. The example staking tool includes one or more staking ears extending outward from the second side of the body and a channel extending through the body and the extension along a longitudinal axis of the staking tool. The channel has a first section with a first diameter and a second section with a second diameter smaller than the first diameter.

An example method disclosed herein includes inserting a valve stem into a valve plug. An end of the valve stem extends outward from a bottom of the valve plug, and an outer surface of the valve stem is threaded. The valve stem has a threaded bore extending into the end of the valve stem along a longitudinal axis of the valve stem and a circular rim extending outward from the end of the valve stem. The example method includes threading a nut onto the outer surface of the valve stem. The example method also includes coupling a staking tool onto the end of the valve stem in the direction of the longitudinal axis of the valve stem. The staking tool has one or more staking ears that engage the circular rim on the end of the valve stem. The example method also includes deforming the circular rim radially outward via the one or more staking ears in one or more areas to prevent rotation of the nut relative to the valve stem.

Another example staking tool disclosed herein includes a body having a first surface, a second surface opposite the first surface and a third surface between the first and second surfaces. The example staking tool includes a bore extending through the body along a longitudinal axis of the body. The bore has first section with a first width at the second surface and a second section with a second width adjacent the first surface. The second width is less than the first width. The bore is to receive a bolt with a head of the bolt being disposed within the first section of the bore and a threaded shaft of the bolt extending through the second section of the bore and beyond the first surface of the body. The example staking tool also includes one or more staking walls projecting from the first surface of the body.

BRIEF DESCRIPTION OF THE DRAWINGS

FIG. 4 shows an enlarged view of an end of the example valve stem.

FIG. 7 is a cross-sectional view of the example valve stem and example valve plug of FIG. 4 in an assembled state. FIG. 7 also shows an enlarged view of the end of the valve stem where the end has been staked.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
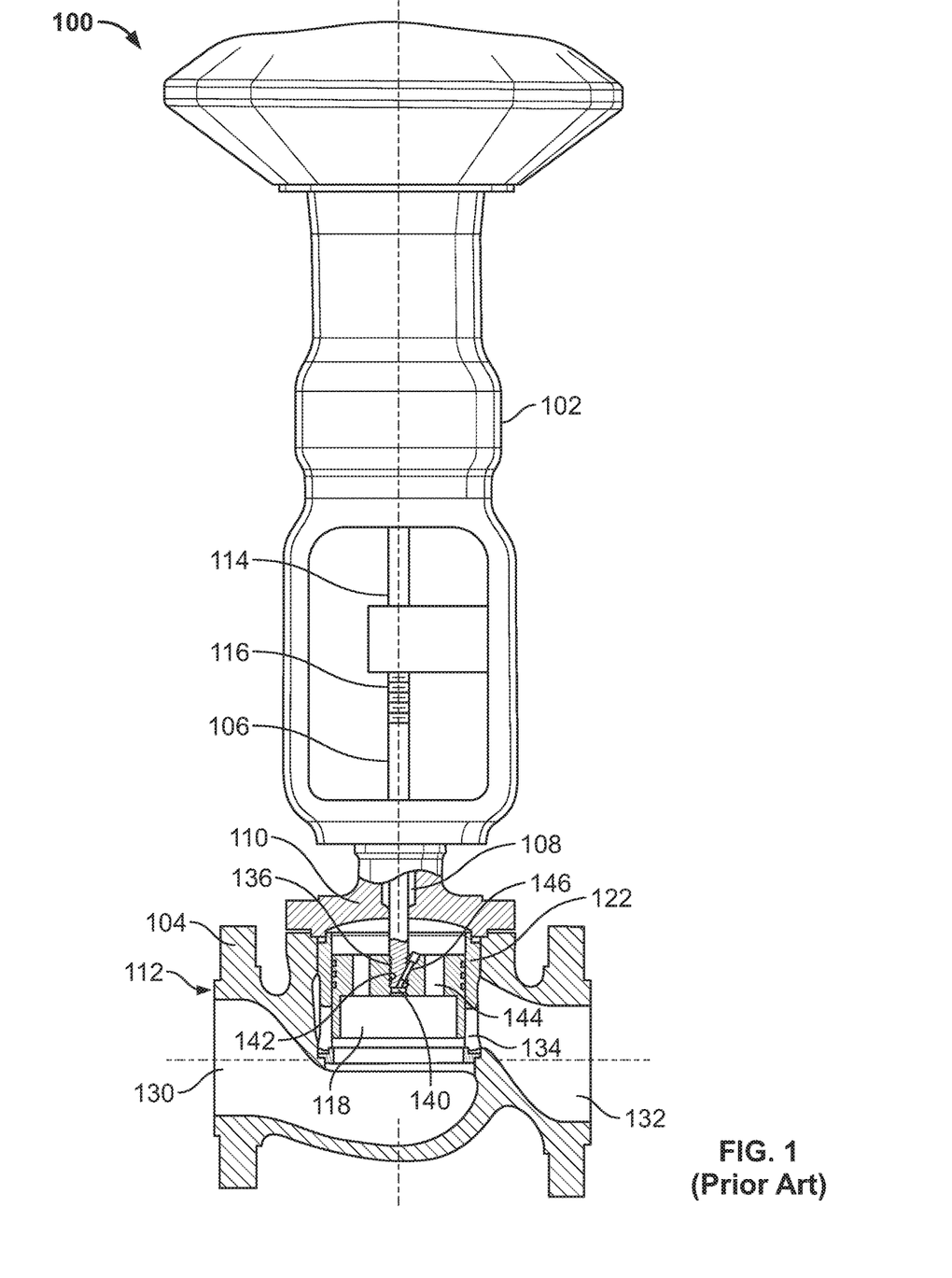
FIG. 1 is a partially cut-away schematic illustration of a known sliding stem valve showing a known valve stem and plug connection.
Figure 2:
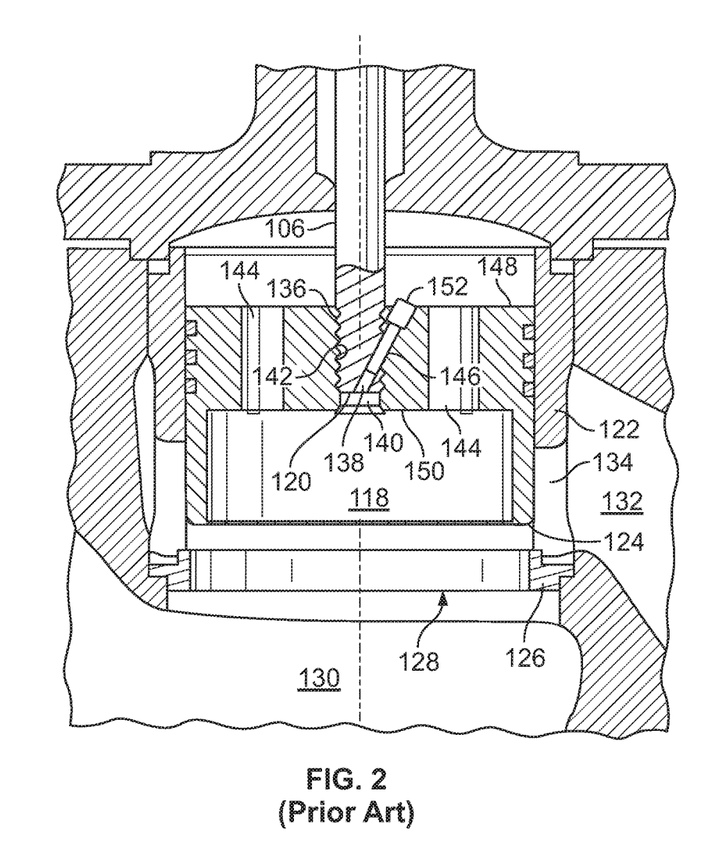
FIG. 2 is an enlarged illustration of a portion of the sliding stem valve in FIG. 1.
Figure 3:
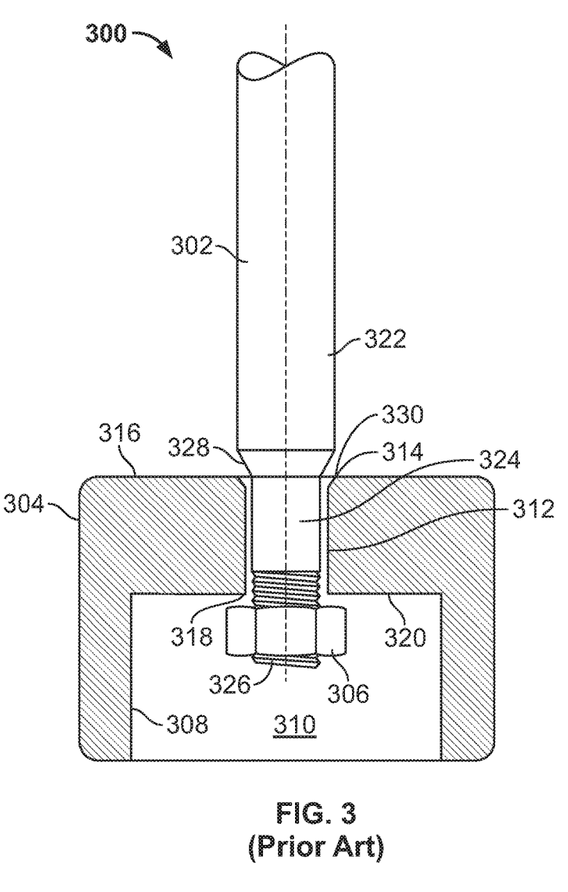
FIG. 3 is cross-sectional view of another known valve stem and plug connection.

Before describing the details of the example valve stem and plug connections and the example staking tools disclosed herein, a brief discussion of known sliding stem valves is first provided in connection with FIGS. 1, 2 and 3. FIG. 1 is a partially cut-away schematic illustration of a known pneumatically actuated sliding stem valve 100. An actuator 102 is coupled to a valve body 104 and controls the movement of a stem 106. The stem 106 extends through a packing system 108 of a bonnet 110 and into a valve assembly 112. FIG. 2 is an enlarged illustration of a portion of the valve assembly 112 of FIG. 1, including the stem 106. The valve stem 106 is coupled to an actuator stem 114 at an upper end 116 of the valve stem 106 and a valve plug 118 at a lower end 120 of the valve stem 106. The valve plug 118 is movable in a cage 122 and includes a seating surface 124 that cooperates with a valve seat 126 of an orifice 128 to control the port area through which fluid may flow from an inlet passage 130 to an outlet passage 132. Thus, the fluid flow permitted through the valve 100 is controlled by the position of the valve stem 106 and the position of the valve plug 118 relative to the valve seat 126 of the orifice 128. The position of the valve stem 106 may be varied from a closed position in which the valve plug 118 is in sealing engagement with the valve seat 126 (i.e., to restrict the flow of fluid through the valve body 104) to a partially open or fully open (e.g., maximum) flow rate position in which the valve plug 118 is away from the valve seat 126 (i.e., to allow the flow of fluid through the valve body 104). In the partially open or fully open position, fluid flows from the inlet 130, through the orifice 128 of the valve seat 126 and a port 134 in the cage 122, and exits the outlet 132.

As more clearly shown in FIG. 2, the lower end 120 of the stem 106 has threads 136 and an angled opening 138. The valve plug 118 includes a central through opening 140 with threads 142, valve plug holes or balance passages 144, and a counter bore 146 that extends at an angle from a first valve surface 148 and toward a second valve surface 150. The threads 136 at the lower end 120 of the stem 106 are received by the threads 142 of the valve plug 118. As can be readily seen in FIG. 2, a pin 152, which is slightly larger in diameter than the counter bore 146, is located in the counter bore 146 of the valve plug 118 and the angled opening 138 of the valve stem 106.

To assemble the valve assembly 112, the central through opening 140 (with the threads 142) is drilled into the valve plug 118, and the threads 136 are formed on the lower end 120 of the stem 106. The stem 106 is then coupled to the valve plug 118 by threading the threads 136 into the threads 142 of the central through opening 140 to position the stem 106 in the valve plug 118. However, threads 136, 142 are generally not effective for accurate radial or angular alignment. The tolerance between the threads 136 of the stem 106 and the threads 142 of the central through opening 140 is relatively loose. Additionally, the central through opening 140 is not always concentric or coaxial with of the stem 106. Further, after repeatedly opening and closing the valve 100, the threads 136, 142 tend to become worn and loosen. In some instances, the alignment between a stem and a plug needs to achieve a certain tolerance (e.g., total indicator reading (TIR), run-out) to comply with certain standards or classifications. For example, for Class V shut-off, the alignment between the plug and the stem needs to be better than 0.010 inches TIR. TIR is the difference between the maximum and minimum measurements on the surface of a part or between two parts. However, the plug and stem connection of the valve assembly 112 shown in FIG. 2 results in alignment between 0.0001 inches to 0.081 inches, which is a relatively large range, most of which fails to meet the Class V shut-off standards.

Further, after the stem 106 has been threaded into the central through opening 140, a bore is drilled into the plug 118 and the stem 106 to form the counter bore 146 and the opening 138. The pin 152 is then press-fitted or hammered into the counter bore 146 and the opening 138 to secure the stem 106 to the valve plug 118 and prevent the valve plug 118 from rotating relative to the stem 106. This process of press-fitting the pin 152 into the stem 106 at an angle can cause the stem 106 to become misaligned (i.e., positioned at a non-perpendicular angle relative to the valve plug 118). This misalignment of the stem 106 relative to the valve plug 118 can also affect the integrity of the coupling (e.g., the connection, the joint) of the stem 106 and the valve plug 118 and, thus, the sealing interaction between the valve plug 118 and the valve seat 126.

Additionally, when the valve 100 is used in more severe applications, such as those that expose the valve assembly 112 to relatively higher temperatures and/or vibrations, the valve stem and plug connection tends to become worn and loosen, which leads to further misalignment between the stem 106 and the plug 118 and, thus, between the plug 118 and valve seat 126. In some instances, this wear causes the central opening 140 to widen. To remedy this situation, a larger diameter valve stem may be used with the existing valve plug 118 to provide a better connection between the valve stem 106 and the valve plug 118. The new valve stem is manufactured by starting with stem stock having a larger diameter (e.g., larger than the original valve stem 106) than the opening through the bonnet 110, and then machining the main portion of the valve stem (so that the valve stem can fit through the packing system 108 in the bonnet 110) except for the lower end of the valve stem that is to be inserted into the central opening 140. However, this machining process is expensive and often causes bending of the valve stem being bent, which requires further machine working to straighten the valve stem. Also, with some materials such as strain hardened 316SST steel, this machining process removes the stronger outer surface of the valve stem, which weakens the valve stem and can lead to further loosening and or breaking.

FIG. 3 is a partially cut-away schematic of another known valve assembly 300 having a stem 302 coupled to a valve plug 304 via a fastening member 306. The valve plug 304 is a cylindrical member having an inner wall portion 308 defining a cavity 310. The valve plug 304 includes a central opening 312, which is defined by a first opening 314 in a first surface 316 of the valve plug 304 and a second opening 318 in a second surface 320 of the valve plug 304. The valve stem 302 has a first portion or section 322 having a first diameter or cross-section and a second portion or section 324 having a second diameter or cross-section that is smaller than the diameter. The second section 324 has a threaded section 326. When the valve stem 304 is inserted into the central opening 312 of the valve plug 304, the threaded section 326 extends beyond the second surface 320 of the valve plug 304 and the fastening mechanism 306 is threadably attached to the second section 324 of the stem 302 to couple the stem 302 to the plug 304. Between the first and second sections 322, 324 of the stem 302, the stem 302 has a shoulder or bevel 328 (e.g., a neck). The first opening 314 of the central opening 312 also has corresponding a shoulder or bevel 330. When the stem 302 is inserted into the central opening 312, the bevel 328 engages the bevel 330 of the first opening 314 to center or align the stem 302 with the central opening 312.

To manufacture the valve stem 302, a stem stock having a diameter of the first section 322 is machined down at the end to form the shoulder 328 and the second section 324. However, this machining process removes material from areas of the valve stem 302 where the strength of the material is needed most (i.e., at the interface between the stem 302 and the plug 304). When the material is removed, there is relatively less area on which a load can act. Additionally, any forces or stresses on the stem 302 concentrate at the shoulder 328. In high temperature and/or high vibration environments, the shoulder 328 may become fatigued relatively faster than a full-diameter stem. As a result, the stem and plug connection tends to wear and loosen. In some instances, the central opening 312 widens and a wider stem is then used to provide a better connection. However, the wider replacement stem is formed similar to the machining process described above and, thus, ultimately suffers from similar drawbacks.

Another drawback of the valve assembly 300 shown in FIG. 3 is that the fastening mechanism 306 tends to loosen when the valve assembly 300 is exposed environments with relatively higher temperatures and/or vibrations. In some instances, to maintain the attachment between the valve stem 302 and the valve plug 304, the valve stem 302 and/or the fastening mechanism 306 is welded to the valve plug 304. However, the valve stem 302, the fastening mechanism 306 and/or the valve plug 304 often cannot be welded together if the valve stem 302, the fastening mechanism 306 or the valve plug 304 are made of a non-weldable material, or if the filler material is incompatible with the base material of the valve stem 302, the fastening mechanism 306 or the valve plug 304. Further, in some instances, welding causes an increased deformation in the valve stem 302 and the valve plug 304 due to the heat generated during the welding process. Therefore, additional post-weld treatment and/or machining is required to straighten the stem 302. In other situations, the end of the stem 302 is staked using a high impact tool to deform the end of the stem 302. However, similar to the pin approach discussed above, this process tends to cause the valve stem 302 to become misaligned with the valve plug 304 and, thus, compromises the integrity of the valve assembly 300.

Disclosed herein are example valve stem and plug connections that substantially reduce and/or eliminate alignment and loosing problems experienced by the known connections described above. In general, the example valve stem and plug connections disclosed herein include an example stem having a tapered section and a plug with a channel having a corresponding tapered section. When the stem is inserted into the plug, the tapered section of the stem frictionally engages (e.g., contacts) the tapered section of the plug. The tapered sections are angled at a relatively gradual or small angle (e.g., about 1.5 degrees ((°), which results in better alignment between the stem and the plug so the valve can achieve greater shut-off performance. Additionally, the engagement or intimate contact between the tapered sections forms a self-aligning and self-locking connection (e.g., a self-locking joint, a locking taper). In particular, the angle of the taper is less than an angle (e.g., about 7°) that results in frictional retention between the surfaces that is greater than a retraction force to separate the stem from the plug (i.e., a machine taper or self-holding taper). Further, the tapered sections result in a relatively greater contact area between the stem and the plug. The relatively greater contact area not only resists movement of the stem out of the channel of the plug, but the increased contact area results in better alignment, improved stress distribution, improved fatigue life, and prevents local yielding and loosening due to vibration. The increased engagement length also prevents the example valve stem and plug connection from acting like the pin joint employed in the valve assembly 112 of FIGS. 1 and 2 and rotating around a single contact point between the stem and the plug.

The example valve stem and plug connections are also relatively easier to assemble. In some examples disclosed herein, an end of the stem extends through the valve plug and a fastening mechanism, such as a nut, is attached to the end of the stem extending beyond the valve plug. The self-locking connection (which can be generated with hand force) enables an operator to attach the nut without having to employ other support members or vices for clamping the stem and plug in place (i.e., the frictional force between the stem and plug is sufficient to hold the stem in place while screwing on the nut). Additionally, when the nut is tightened onto the stem, the stem is pulled further into the channel of the plug, thereby putting the section of the stem disposed in the channel in axial tension while putting the outer diameter of the tapered section in compression. This tension and compression leads to a relatively stronger, more reliable connection than known stem and plug connections. Additionally, the tension and compression reduces the amount of fatigue in the stem that is typically caused by high temperature and/or high vibration environments. Thus, the example valve stem and plug connections can be used in more severe applications (e.g., in environments with high temperatures and/or vibration, such as in the power industries). Also, during operation when the valve plug is pushed into a seat ring or valve seat, the valve stem is further forced into the channel of the valve plug and, thus, further causes the valve stem to become aligned within the channel.

The example valve stem and plug connections can achieve tolerances that are better than 0.010 inches (e.g., 0.002 inches) and, thus, can meet requirements of a Class V rating. Also, unlike the pin joint connection in FIGS. 1 and 2, the example valve stem and plug connections do not require forcing a pin into the stem, which can cause the stem to become misaligned.

Further, the example valve stems described herein can be made from existing stem stock (e.g., standard ground and polished stem stock) and do not require additional machining and/or straightening after assembly, as compared to the known valve stem and plug connections described above. For example, because the example valve stem and plug connections are resistant to wear and loosening, manufacturing the example valve stems do not require starting with a relatively larger diameter stock and machining down the main portion of the stock, as described in connection with the known valve stems above. Therefore, the example valve stems do not require additional post-machine treatment to straighten the valve stem. Additionally, because the tapered section of the example valve stem is gradual (e.g., less steep), the taper does not form a shoulder that would otherwise create weak areas in the stem.

Also disclosed herein are example staking tools that may be used to stake an end of a valve stem, such as the example tapered valve stems, to prevent a nut from rotating relative to the stem and inadvertently being removed or otherwise loosened. In general, the example staking tools disclosed herein include one or more staking prongs, ears or walls and a channel that is to receive a fastener such as a bolt. One example staking tool is to be fastened, via a bolt, to an end of a stem. As the staking tool is tightened into the end of the stem, the staking ears deform a wall or rim on the end of the stem radially outward over the nut. The example staking tools do not require hammering or impact operations that commonly result in misalignment, as described above. Instead, the example staking tools are coupled to an end of the valve stem and tightened onto the end of the valve stem in a direction that is aligned with a longitudinal axis of the valve stem. The forces generated when tightening the staking tool are concentrated near the end of the valve stem along the longitudinal axis of the valve stem and, thus, do not affect the alignment between the valve stem and the valve plug.

Figure 4:
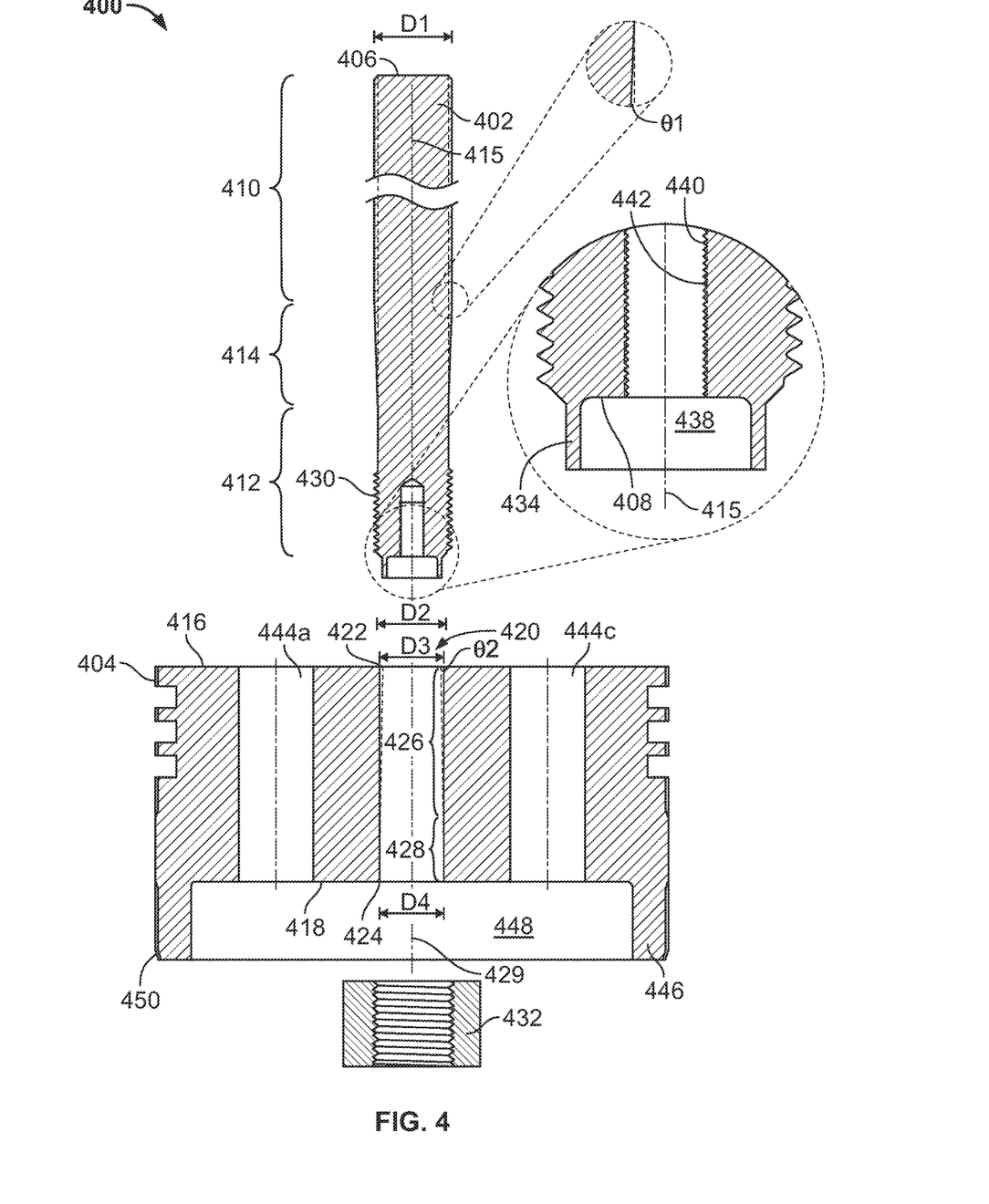
FIG. 4 is a cross-sectional view of an unassembled example valve stem and example valve plug constructed in accordance with the teachings of this disclosure.

A cross-sectional view of an example valve assembly 400 having an example valve stem 402 and example valve plug 404 (e.g., a closure member, a valve member, a control member) is illustrated in FIG. 4. The example valve assembly 400 may be used in any valve with a cage guided non-contoured plug trim set (e.g., a sliding stem valve) such as, for example, the sliding stem valve 100 of FIG. 1. In the illustrated example, the stem 402 has an upper end 406 and a lower end 408 opposite the upper end 406. The upper end 406 is to be coupled to an actuator or a stem of an actuator and the lower end 408 is to be coupled to the plug 404. For example, the upper end 406 may be coupled to the actuator stem 114 of the actuated sliding stem valve 100 depicted in FIG. 1. In the illustrated example of FIG. 4, the stem 402 has a first portion or section 410, a second portion or section 412 and a third portion or section 414. The first section 410 has a first diameter or width (e.g., cross-section) denoted by D1, and the second section 412 has a second diameter or width denoted by D2 that is less than the first diameter D1. The first and second diameters D1, D2 of the respective first and second sections 410, 412 are substantially constant. In other words, the first section 410 has a substantially constant diameter equal to the first diameter D1, and the second section 412 has a substantially constant diameter equal to the second diameter D2. The third section 414 is between the first and second sections 410, 412 and is tapered (e.g., has a decreasing diameter or width). In other words, the third section 414 has a diameter or width that decreases from the first diameter D1 at the first section 410 to the second diameter D2 at the second section 412. The angle of the taper is denoted as angle θ1, which represents the angle of the outer surface of the third section 414 relative to the outer surfaces of the first and second sections 410, 412 and/or a longitudinal axis 415 of the stem 402. In the illustrated example, the angle θ1 is substantially linear or constant along the third section 414. However, in other examples, the taper may be non-linear angle (e.g., a taper that changes at different rates throughout the length of the third section 414). The first section 410 of the stem 402 may be any length. In the illustrated example, the second section 412 of the stem 402 is longer than the third section 414 of the stem 402. However, in other examples, the third section 414 of the stem 412 may be longer than the second section 412 of the stem 402.

Figure 5:
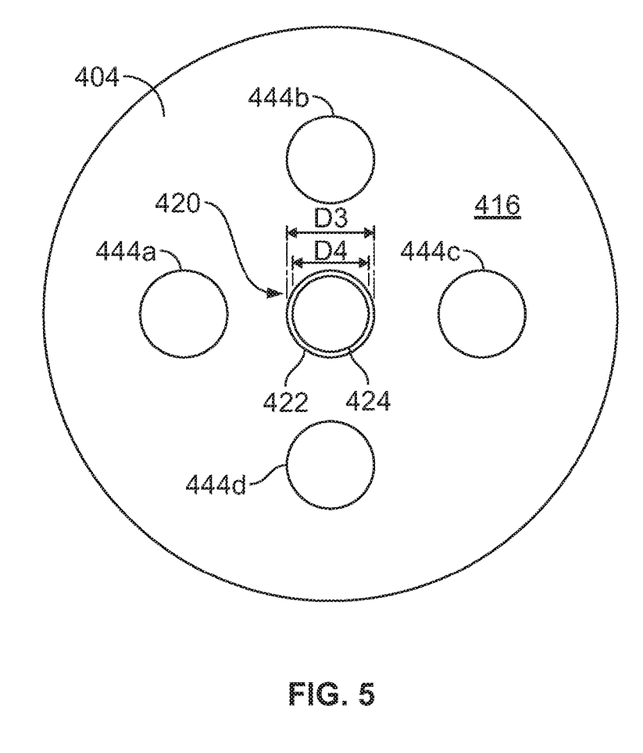
FIG. 5 is a top view of the example valve plug of FIG. 4.

In the illustrated example, the plug 404 has a first surface or side 416 (e.g., a top side) and a second surface or side 418 opposite the first side 416. To receive the stem 402, the plug 404 has a central channel 420 (e.g., an opening, a through-hole, an aperture, a bore, etc.) formed between a first opening 422 in the first side 416 and a second opening 424 in the second side 418. In the illustrated example, the first opening 422 has a third diameter or width denoted as D3 and the second opening 424 has a fourth diameter or width denoted as D4 that is less than the third diameter D3. The channel 420 has a first portion or section 426 and a second portion or section 428. In the illustrated example, the first section 426 of the channel 420 is tapered and the second section 428 of the channel 420 has a substantially constant diameter. The first section 426 of the channel 420 is tapered from the third diameter D3 at the first opening 422 to the fourth diameter D4 at the second section 428. The angle of the taper is denoted as θ2, which represents the angle of the inner surface of the first section 426 of the channel 420 to the inner surface of the second section 428 of the channel and/or a longitudinal axis 429 of the plug 404. In the illustrated example, the angle θ1 of the third section 414 of the stem 402 is substantially the same as the angle θ2 of the first section 426 of the channel 420. The second section 428 of the channel 420 has a substantially constant diameter equal to the fourth diameter D4. A top view of the example plug 404 is illustrated in FIG. 5, where the taper of the first section 426 of the channel 420 can be seen between the third diameter D3 and the fourth diameter D4. In the illustrated example, the fourth diameter D4 of the second opening 424 is substantially equal to or larger than the second diameter D2 of the second section 412 of the stem 402. Therefore, when the stem 402 is inserted into the channel 420, the third section 414 of the stem 402 engages or contacts the first section 426 of the channel 420 and the second section 412 of the stem 402 extends through the second section 428 of the channel 420 and beyond the second side 418 of the valve plug 404. The third section 414 of the valve stem 402 may be the same length as, shorter than or longer than the first section 426 of the channel 420. In the illustrated example, the first section 426 of the channel 420 is longer than the second section 428 of the channel 420. However, in other examples, the second section 428 may be the same length as or longer than the first section 426 of the opening 420.

In the illustrated example, the angles θ1, θ2, which are substantially the same, may be any angle less than about 7°, which results in frictional force between the outer surface of the third section 414 of the stem 402 and the inner surface of the first section 426 of the channel 420 that resists retraction of the stem 402 from the channel 420. In other words, the stem 402 and the plug 404 form a self-locking connection or joint. For example, the angles θ1, θ2 may be about 1.5°. In the illustrated example, the length of the third section 414 of the stem 402 and the first section 426 of the channel 420 is about 1.75 inches. In such an example, the second diameter D2 is about 0.125 inches (e.g., an eighth (⅛) of an inch) less than the first diameter D1, and the fourth diameter D4 is also about 0.125 inches less than the third diameter D3. For example, if first diameter D1 is 1.0 inch, then the second diameter D2 is about 0.875 inches. When the stem 402 is inserted into the channel 420, there is a relatively large surface contact area between the third section 414 of the stem 402 and the first section 426 of the channel 420. This relatively large contact area not only reduces or prevents the ability of the stem 402 to be removed from the channel 420, but the large contact area also helps align the stem 402, coaxially, within the channel 420 of the plug 404.

In other examples, other types of tapers (e.g., self-locking tapers) may be implemented that provide a similar frictional force that prevents the stem 402 from being removed from the channel 420. For example, the taper may be a Morse taper, a Jacobs taper, a Jarno taper, or a Brown & Sharpe taper. Each of these types specifies a taper (e.g., in inches per foot) based on the diameter of the smaller end, the diameter of the larger end and/or the axial distance between the two ends. Therefore, in other examples, the angles θ1, θ2 of the tapers, the diameters D1, D2, D3, D4 and/or the lengths of the tapered sections 416, 426 may be different. In other words, any of the angles θ1, θ2 of the tapers, the diameters D1, D2, D3, D4 and/or the lengths of the tapered sections 414, 416 may be dependent on the desired values of any one or more of these parameters.

In the illustrated example, the third section 414 of the stem 402 decreases from the first diameter D1 of the first section 410 to the second diameter D2 of the second section. However, in other examples, the diameters of the first and second sections 410, 412 may be different than the diameters of the top and/or bottom of the third section 414 (i.e., where the taper starts and/or stops). For example, a shoulder or edge may be provided between the third section 414 and the second section 412 such that diameter of the third section 414 decreases to a diameter that is different than a diameter of the second section 412. Likewise, for the plug 404, the diameters of the first opening 422 and/or the second opening 424 may be different than the diameters of where the taper of the first section 426 of the channel 420 starts and/or stops. For example, a shoulder or edge may be provided between the first opening 422 and the start of the tapered first portion 426 of the channel 420 such that the first section 426 of the channel 420 has a diameter that is different than a diameter of the first opening 422.

Figure 6:
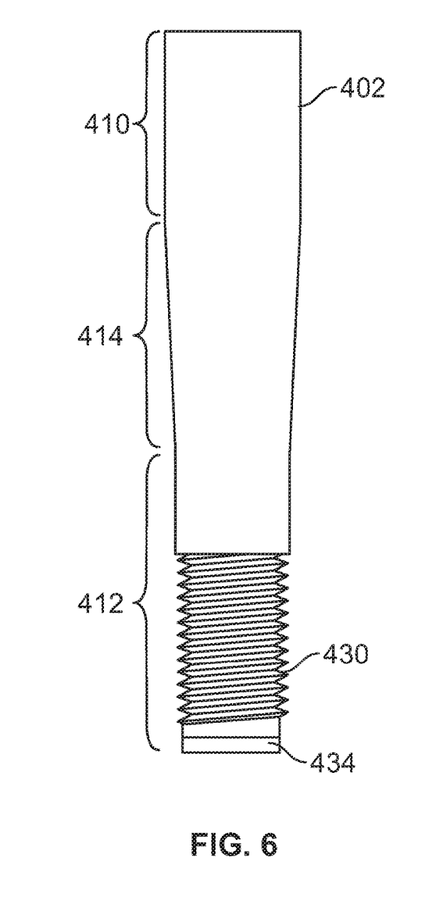
FIG. 6 is a side view of the example valve stem of FIG. 4.

To further couple the stem 402 to the plug 404, the second section 412 of the stem 402 includes a threaded segment 430, and a fastening mechanism may be attached to the threaded segment 430 that extends beyond the second side 418 of the plug 404. In the illustrated example, the fastening mechanism is implemented as a threaded nut 432 (e.g., a retaining nut, a tensioning nut). A side view of the example valve stem 402 is illustrated in FIG. 6, where the first section 410, the second section 412, the third section 414, the threaded segment 430 and a rim or wall 434 can be seen. In some examples, to further secure or fasten the nut 432 to the end 408 of the stem 402, the end 408 of the stem 402 may be deformed, via staking, which prevents the nut 432 from being rotated (e.g., in a direction that loosens the nut 432 from the stem 402) relative to the stem 402. An example staking tool for staking an end of a stem is disclosed in further detail herein. In the illustrated example of FIG. 4, the rim 434 (e.g., a wall, a lip) extends from the end 408 of the stem 402 in a direction that is parallel to the longitudinal axis 415 of the stem 402. The wall 434 forms a cavity 438. After the nut 432 is attached to the second section 412 of the stem 402, one or more portions of the wall 434 or the entire wall 434 can be deformed outward to prevent the nut 432 from being removed (e.g., unthreaded) from the stem 402. In the illustrated example, the wall 434 extends about 0.25 inches from the end 408 of the stem 402 and has an inner diameter of about 0.65 inches. However, in other examples, the wall 434 may extend other distances from the end 408 of the stem 402. The cavity 438 and the wall 434 may be formed by drilling a counter bore into an end of a stem stock. Furthermore, to couple a staking tool to the stem 402 (as discussed in further detail herein), a bore 440 extends into the end 408 of the stem 402 along the longitudinal axis 415 of the stem 402. The bore 440 has threads 442, which may be used to couple a staking tool to the end 408 of the stem 402. In the illustrated example, the bore 440 has a diameter of about 0.3125 inches. However, in other examples, the bore 440 may be another diameter.

As described herein, the example stem 402 and the example plug 404 are self locking, which simplifies assembly of the valve assembly 400. For example, in some instances the stem and plug 402, 404 are installed in a valve body in a vertical orientation. For example, the stem 402 may first be inserted through a bonnet of a valve body in a vertical orientation. Then, the plug 404 is aligned beneath the end 408 of the stem 408 and may be moved upward to insert the stem 402 into the channel 420. Once the stem and plug 402, 404 are pushed together, the frictional force created by the contact between the third section 414 of the stem 402 and the first section 426 of the channel 420 prevents the stem 402 from being removed from the channel 420. The stem 402 and the plug 404 can be forced together by hand to create enough friction to prevent the plug 404 from falling off of the stem 402. An operator can then screw the nut 432 onto the threaded section 430 of the stem 430. As a result, the example valve plug and stem 402, 404 can be assembled without having to use a vice or other support structure. In some instances, the entire assembly of the valve can be performed at one work station.

As illustrated in FIGS. 4 and 5, the plug 404 is a balanced plug having balance passages 444a, 444b, 444c, 444d. The balance passages 444a, 444b, 444c, 444d enable fluid communication between the first and second sides 416, 418 of the plug 404. In other examples, the plug 404 may have more or fewer balance passages. In other examples, the plug 404 may have no balance passages. In the illustrated example, the plug 404 has a wall 446 that extends from the second side 418 to form a cavity 448. An edge of the wall 446 forms a seating surface 450. In other examples, the plug 404 may be another type of closure member (e.g., a disk) or any other structure to vary the flow of fluid through a valve. The plug 404 may be made of steel, aluminum, or any other suitable material(s), and may be formed via machining, injection molding, or any other suitable process(es).

Figure 7:
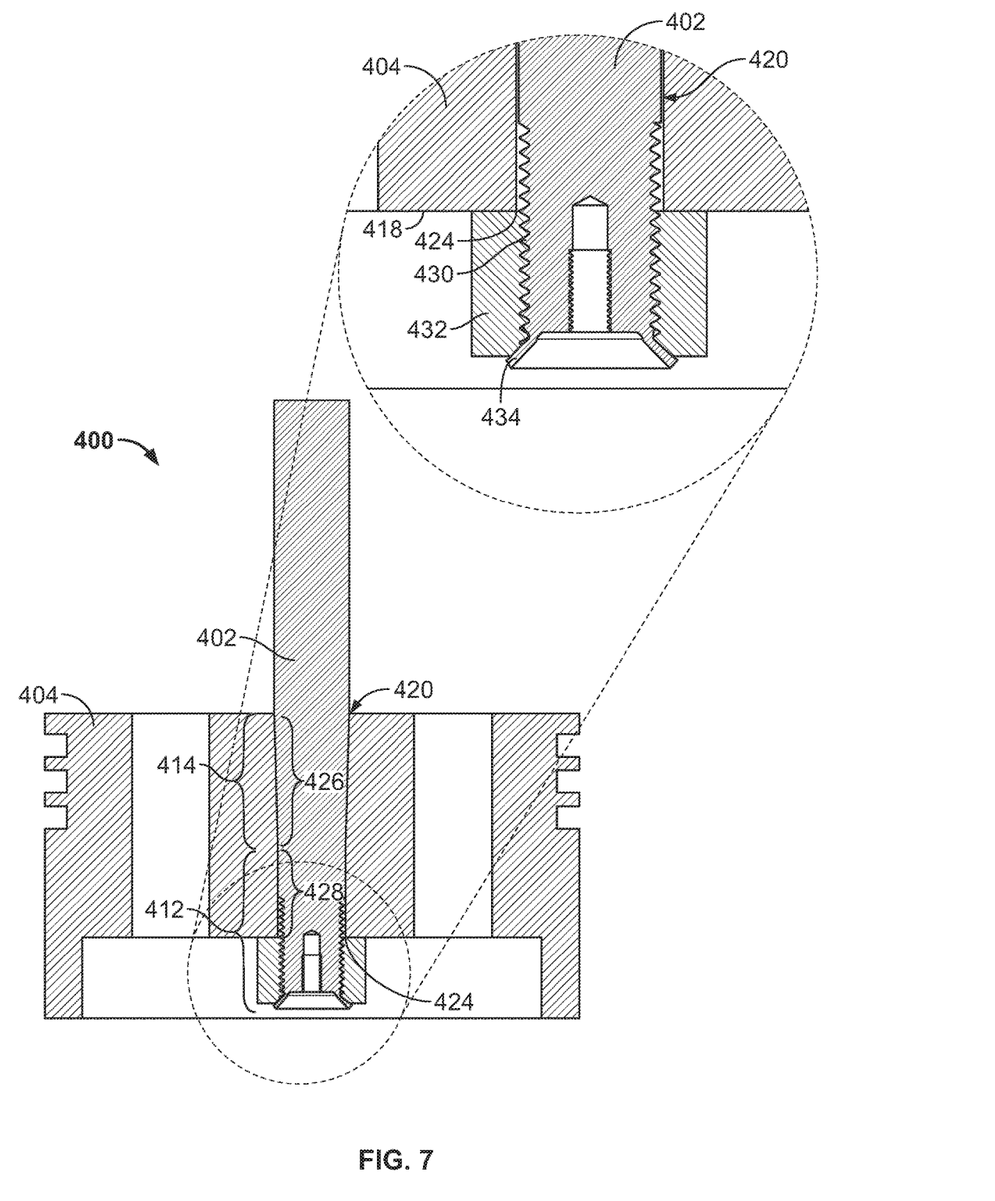

FIG. 7 illustrates the example stem 402 and the example plug 404 of the valve assembly 400 in an assembled state. In the illustrated example, the third section 414 of the stem 402 is engaged with first section 426 of the channel 420. The friction between these two surfaces, created by the self-locking taper, provides a retention force that prevents the stem 402 from being removed from the opening 420 of the plug 404. The second section 412 of the stem 402 is disposed in the second section 428 of the opening 420 and extends through the second opening 424 and beyond the second side 418 of the plug 404. When the nut 432 is threaded onto the threaded segment 430 of the stem 402, the nut 432 pulls the stem 402 further into the channel 420 and, thus, increases the frictional force between the third section 414 of the stem 402 and the first section 426 of the channel 420.

Further, when torquing or tightening the nut 432 onto the stem 402, the pulling force of the nut 432 creates an axial tension in the stem 402 through the second and third sections 412, 414 and also compresses the outer diameter of the third section 414 of the stem 402. This axial tension stretches the second section 412 of the stem 402 and causes the stem 402 to act like a spring, thereby producing a vibration and/or fatigue resistant joint that results in better radial and perpendicular alignment between the stem and plug 402, 404. Additionally, this axial tension substantially reduces and/or prevents movement between the stem 402 and the plug 404 and, thus, substantially reduces and/or prevents parts from becoming loose due to thermal changes and/or vibrations. In other words, the stem 402 remains aligned within the channel 404 and the amount of wear and/or loosening is substantially reduced or eliminated, as compared to the known valve stem and plug connections depicted in FIGS. 1-3. As a result, the stem 402 resists fatigue and wearing in more severe applications (e.g., in environments having higher temperatures and/or vibration). Further, whenever the valve plug 404 is pressed into a seat ring (e.g., the valve seat 126 of FIG. 1), the stem 402 is further forced into channel 420 and, thus, the connection between the valve stem 402 and the valve plug 404 is tightened and the valve stem 402 is realigned (e.g., reseated). This axial compression on the joint tightens the joint.

Figure 8:
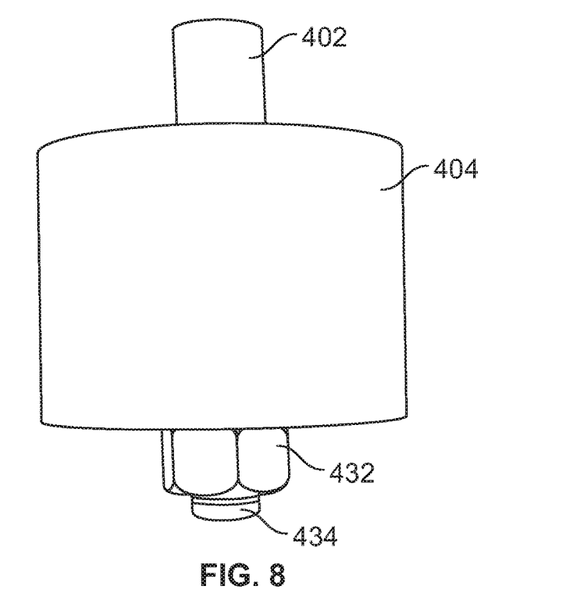
FIG. 8 is a side view of the example valve stem and example valve stem plug of FIG. 4 in an assembled state in which the end of the example valve stem has not been staked.

In the illustrated example of FIG. 7, the wall 434 has been deformed outward and over an end of the nut 432 to prevent the nut 432 from being removed from the stem 402 (e.g., from vibrations, fatigue and/or changes in temperature). In other words, the wall 434 is deformed or staked to prevent the nut 32 from rotating relative to the stem 402. In other examples, the nut 432 may be coupled to the stem 402 with other fastening techniques such as spot welding. FIG. 8 shows a side view of the stem 402 inserted into the plug 404. The wall 446 (FIG. 4) of the plug 404 has been removed in FIG. 8 to show the exposed the nut 432. In the illustrated example of FIG. 8, the wall 434 of the stem 402 has not yet been deformed.

In the illustrated example, the stem 402 is coupled to the plug 404 via the nut 432. However, in other examples, the stem 402 may be coupled to the plug 404 using other techniques. For example, with applications specific to the National Association of Corrosion Engineers (NACE), the end 408 of the stem 402 may be tack-welded to the plug 404. In other examples, a staking tool (e.g., such as the example staking tool disclosed herein) could be used to pull the stem 402 tight and stake the end 408 of the stem 402 to the second side 418 of the plug 404.

Figure 9:
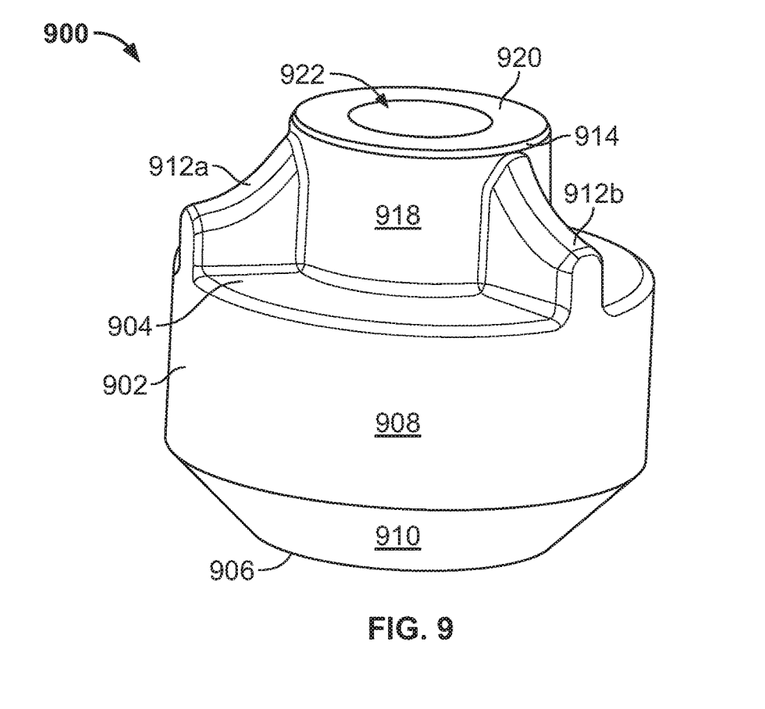
FIG. 9 is a side perspective view of an example staking tool for staking an end of a valve stem such as the example valve stem of FIG. 4 in accordance with the teachings of this disclosure.
Figure 10:
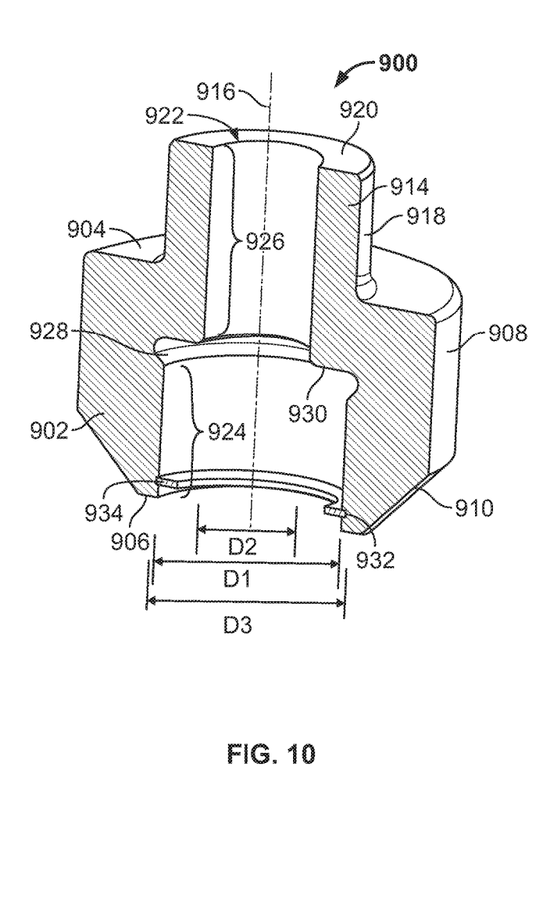
FIG. 10 is a cross-sectional view of the example staking tool of FIG. 9.

An example staking tool 900 for staking an end of a stem (e.g., the end 408 of the stem 402) is illustrated in FIG. 9. A cross-sectional view of the example staking tool 900 is illustrated in FIG. 10. The staking tool 900 has a body 902 with a first surface or side 904 (e.g., a top side), and a second surface or side 906 (e.g., a bottom side) opposite the first side 904, and a third surface or side 908 (e.g., a lateral side). In the illustrated example, the staking tool 900 also has a beveled surface or side 910 between the third side 908 and the second side 906. However, in other examples, the beveled side surface 910 may not be included (e.g., the third side 908 may extend to the second side 906).

To deform an end and/or a wall of a stem, the staking tool 900 includes a one or more staking ears. The staking ears may be implemented as walls, blades, prongs, wedges, stakes and/or any other structure(s) capable of staking a wall or rim. In the illustrated example, the staking tool 900 has three staking ears: a first ear 912a, a second ear 912b and a third ear 912c (see FIG. 11). The ears 912a, 912b, 912c are disposed on and extend outward from the first side 904. The three ears 912a, 912b, 912c extend between (e.g., are coupled to) the first side 904 and an extension 914 that projects from the first side 904 in a direction parallel to a longitudinal axis 916 of the body 902. The extension 914 has an outer surface 918 and an end surface 920. In the illustrated example, a diameter or width of the extension 914 at the outer surface 918 is less than a diameter or width of the body 902 at the third surface 908.

Figure 11:
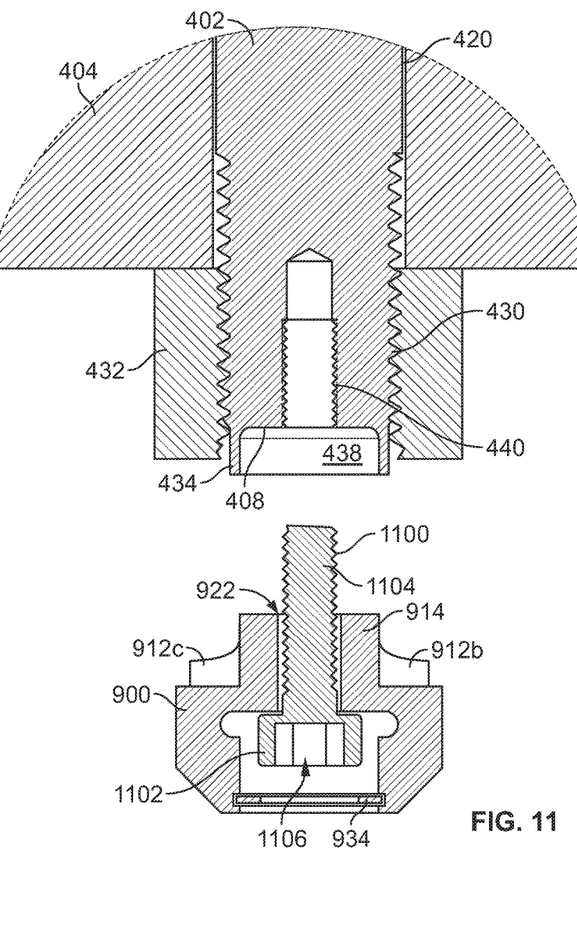
FIG. 11 is a cross-sectional view of the end of the example valve stem of FIG. 4 and the example staking tool of FIG. 9.

To enable the staking tool 900 to be fastened onto an end of a stem, the staking tool 900 has a channel 922 (e.g., an opening, a through-hole, an aperture, a bore, etc.) for accommodating a fastener, such as a bolt (e.g., the bolt 1100 of FIG. 11 as described in further detail herein). The channel 922, as illustrated more clearly in FIG. 10, extends through the body 902 and the extension 914 along the longitudinal axis 916. The channel 922 has a first portion or section 924 and a second portion or section 926. The first section 924 of the channel 922 is within the body 902 and the second section 926 of the channel 922 extends through the extension 914 and into the body 902. The first section 924 has a first diameter denoted by D1 and the second section 926 has a second diameter denoted by D2 that is smaller than the first diameter D1. However, in other examples, the diameters may be different or the same. A bolt, having a head and a threaded shaft, can be inserted into the channel 922 such that the head is disposed in the first section 924 of the channel 922 and the threaded shaft extends through the second section 926 of the channel 922 and out of the top surface 920 of the extension 914. In the illustrated example, the second section 926 is longer than the first section 924. However, in other examples, the first section 924 may be longer than the second section 926.

In the illustrated example, the channel 922 also has a third portion or section 928 between the first and second sections 924, 926. The third section 928 of the channel 922 has a third diameter denoted by D3 that is larger than the first and second diameters D1, D2 of the respective first and second sections 924, 926. A surface 930 is defined between the second and third sections 926, 928 where the head of the bolt engages when tightening the staking tool 900 onto a stem. In many instances, the staking tool 900 may be used to stake a stem from the bottom of the stem, or beneath the stem. The staking tool 900 is to be fastened into the bottom of the stem and tightened onto the stem to deform an end and/or a wall of the stem. To prevent the bolt from falling out of the channel 922 while an operator is moving the staking tool 900 toward the bottom of the stem, a groove 932 is formed in the inner surface of the channel 922 that retains a snap ring 934. The snap ring 934 has an inside diameter that is less than an outside diameter of the bolt head. The snap ring 934 may be made out of plastic or rubber, for example.

FIG. 11 illustrates an enlarged cross-sectional view of the end 408 of the stem 402 extending through the channel 420 of the plug 404. The nut 432 has been threadably coupled to the threaded segment 430 of the stem 402. In the illustrated example, a bolt 1100 is disposed within the channel 922 of the staking tool 900. The bolt 1100 has a head 1102 and a threaded shaft 1104. To stake or deform the wall 434 on the stem 402, the threaded shaft 1104 of the bolt is screwed or threaded into the bore 440. As the bolt 1100 is tightened, the extension 914 of the staking tool 900 moves into the cavity 438. Eventually, as the bolt 1100 is further tightened or torqued, the ears 912a, 912b, 912c engage the wall 434 and deform the wall 434 outwards (e.g., as shown in FIG. 7). In the illustrated example, the bolt 1100 is implemented as a socket head cap screw, which includes an opening 1106 in the head 1102 to receive a tool (e.g., a hex key or Allen key). The opening 1106 has a smaller diameter than the opening in the snap ring 934, which enables the tool to be inserted into the head 1102 of the bolt 1100 without removing the snap ring 934. Thus, the bolt 1100 can remain disposed within the staking tool 900. In other examples, the opening 1106 may be shaped differently (e.g., a star pattern, a slot, etc.) to receive any other tool or bit (e.g., a star bit, a standard or slotted screw driver, etc.). In other examples, the bolt 1100 may be implemented as another type of fastening device, such as a flanged bolt (e.g., a washer head bolt), a flat head screw cap, etc.

Figure 12:
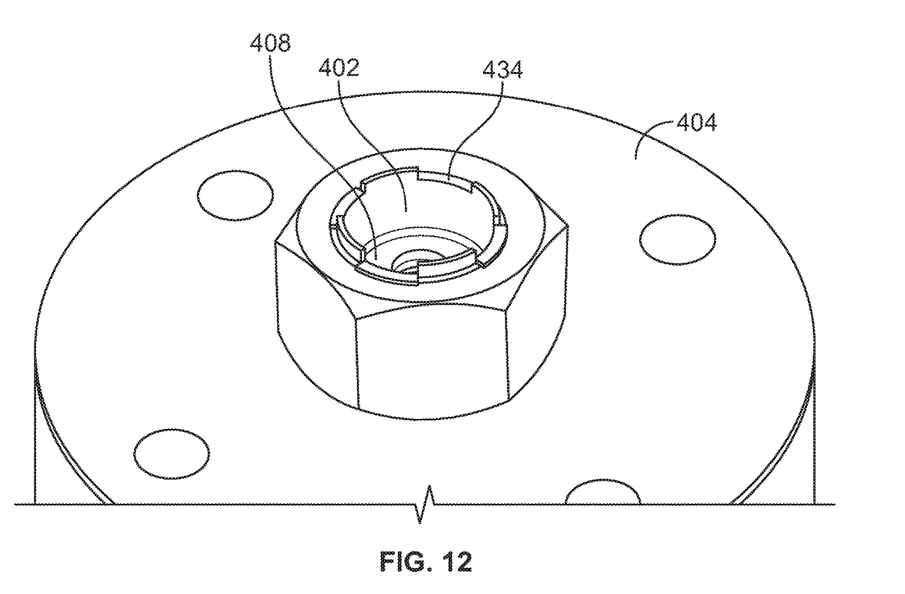
FIG. 12 is a perspective view of the end of the example valve stem of FIG. 11 after being staked by the example staking tool of FIG. 9.

FIG. 12 shows a bottom view of the stem 402 after the wall 434 has been deformed. Because the staking tool 900 uses the end 408 of the stem 402 as the reaction load for performing the staking operation, no additional loads or impacts are being application to the stem 402 and, thus, the connection between the valve stem and plug 402, 404. As a result, the valve stem and plug 402, 404 are not loosened or knocked out of alignment, as often encountered with using known staking and welding techniques.

Figure 13:
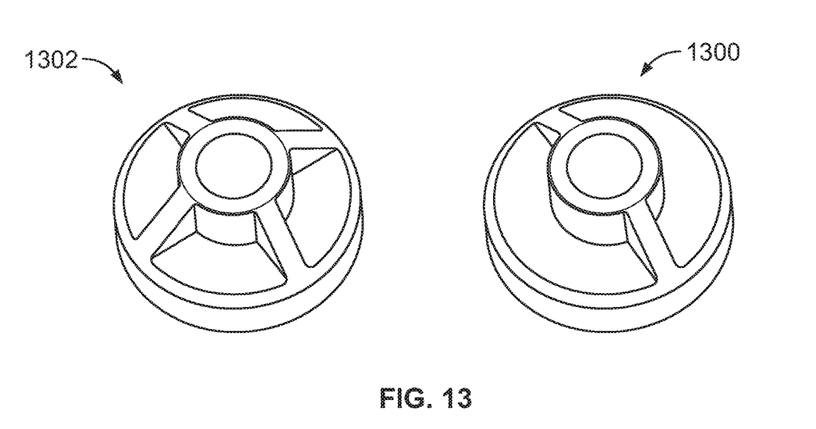
FIG. 13 illustrates other example staking tools having multiple staking prongs that may be used to stake an end of a valve stem.

In the illustrated example, the staking tool 900 has three staking ears. However, the staking tool 900 may have more or fewer ears that may have different shapes (e.g., profiles) and may be spaced differently. FIG. 13 illustrates alternative staking tools having different numbers of ears. A two ear staking tool 1300 has two ears that are spaced at equal radial distances from each other (e.g., on opposite sides than each other), and a four ear staking tool 1302 has four ears that are spaced at equal radial distances from each other. In other examples, a curved or angled circumferential wall may be provided between the extension 914 and the top surface 904, such that when the staking tool is used, the entire wall 434 is deformed outwards.

Figure 14:
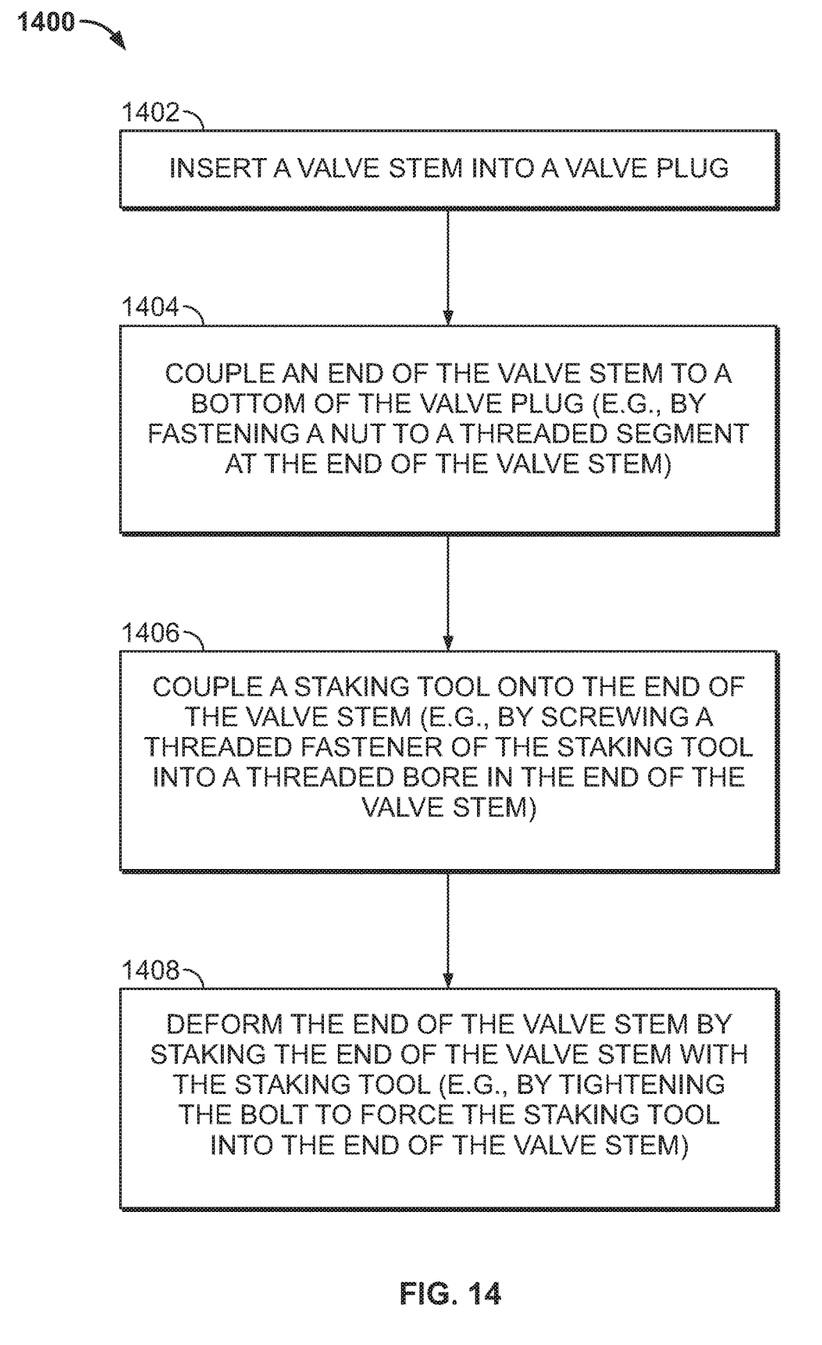
FIG. 14 is a flowchart representative of an example method or process for coupling a valve stem to a valve plug and deforming or staking an end of the valve stem, which may be performed with the example staking tool of FIG. 9.

FIG. 14 illustrates an example flowchart representative of an example method 1400 for staking an end of a stem that may be implemented using the example staking tool 900 of FIG. 9. The example method 1400 is described in connection with the stem 402 of FIG. 4. However, it is to be understood that the example method 900 may be used with any stem having a threaded bore and a wall that can be deformed. For example, the method 1400 could be performed on the stem 302 shown in FIG. 3, if a threaded bore is formed in the end of the stem 302 and a wall is formed that extends from the end of the stem 302. The example method 1400 may be performed by a human operator and/or by a machine.

In the illustrated example, the method 1400 includes inserting a valve stem into a valve plug (block 1402). For example, as illustrated in FIG. 7, the stem 402 may be inserted into the channel 420 in the plug 404. The example method 1400 includes coupling an end of the valve stem to a bottom of the valve plug (block 1404). In some examples, a retaining nut or other fastening mechanism may be threaded or screwed onto a threaded segment at the end of the valve stem. For example, as illustrated in FIG. 7, the nut 432 is threaded onto the threaded segment 430 and engages the second side 418 (e.g., a bottom side) of the plug 404. The example method 1400 includes coupling a staking tool onto the end of the valve stem (block 1406). In some examples, a bolt or other threaded fastener may be used to couple the staking tool onto the end of the valve stem. For example, as illustrated in FIG. 11, the bolt 1100 may be screwed into the bore 440 in the end 408 of the stem 402. The example method 1400 includes deforming the end of the valve stem by staking the end of the valve stem (block 1408). In some examples, deforming the end of the valve stem includes tightening or torquing the bolt to force the staking tool into the end of the valve stem. For example, as illustrated in FIG. 11, the bolt 1100 can be screwed into the bore 440 in the end 408 of the stem 402. After tightening the bolt 1100, the first, second and third staking ears 912a, 912b, 912c engage the wall 434 on the end of the stem 402 and deform the wall 434 outwards over the nut 432 to prevent the nut 432 from rotating relative to the stem 402.

From the foregoing, it will be appreciated that the above disclosed valve stem and plug connections provide better alignment between the valve stem and plug that resists movement and fatigue of the valve stem and plug and, thus, ensures the plug can maintain tight shut-off performance.

The example plug and stem connections also have improved vibration resistance. The tension created in the stem enables the stem and plug connection to better withstand vibration and, thus, prevent loosening. Also, the large contact area between the stem and the plug achieves better stress distribution and prevents local yielding (and loosening due to vibration). Further, the longer engagement between the stem and plug prevents rotation of the stem within the channel of the plug.

The example valve plug and stem connections also result in simplified, lower cost and more efficient manufacturing. The example valve stems and valve plugs can be advantageously manufactured and assembled without stress risers in the higher stress areas of the connection. For example, by employing the example self-locking taper, existing stem sizes can be used to manufacture the example stem without having to machine the stem from a larger diameter stock, as described in the known methods. Further, the example stems do not require a shoulder or neck, which is typically formed by starting with an oversized bar and then removing material to make the part of the stem the standard diameter, which then requires straightening after machining. Instead, the example stems can be made from standard ground and polished stem stock without any straightening procedures.

Additionally, the tapered sections of the stem and the central channel of the plug create a self-locking connection that simplifies assembly of the valve stem and plug. The friction of the taper is sufficient to hold the plug on the stem while the nut is fastened to the stem. This allows for more control on the torque and load on the stem connection and eliminates wind-up of the stem while trying to tighten the connection. Furthermore, the example valve stem and plug connections may achieve less than 0.002 inches TIR without additional machining.

It will also be appreciated that the above disclosed staking tools may be used to deform an end of a stem to prevent a nut from rotating relative to the nut (e.g., loosening). Additionally, the example staking tools may be used to deform the end of the stem without compromising the alignment of the stem within a plug. Further, unlike known staking methods that require additional drilling and pins, there is no need to take the example stem and plug connection to another work station (e.g., which has a drill press to drill a hole through the plug and stem and then pound in a retaining pin). Instead, the staking can be performed at the same station as the plug is installed on the stem.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A staking tool comprising:
a body having a first side and a second side opposite the first side;
an extension projecting outward from the second side of the body, the extension having a smaller diameter than the body, the extension having an end surface;
one or more staking ears extending outward from the second side of the body; and
a channel extending through the body and the extension along a longitudinal axis of the staking tool between a first opening in the first side of the body and a second opening in the end surface of the extension, the channel having a first section with a first diameter, a second section with a second diameter smaller than the first diameter, and an annular groove formed in an inner surface of the first section of the channel and spaced apart from the first opening of the channel, the annular groove to receive a snap ring.

2. The staking tool of claim 1, wherein the one or more staking ears are coupled between the second side of the body and an outer surface of the extension.

3. The staking tool of claim 2, wherein the one or more staking ears are spaced at equal radial distances from each other around the extension.

4. The staking tool of claim 1 further including the snap ring disposed within the annular groove, the snap ring to engage a head of a bolt when the bolt is disposed within the channel.

5. The staking tool of claim 1, wherein the channel further includes a third section between the first section and the second section, the third section having a third diameter larger than the first diameter.

6. The staking tool of claim 1, wherein the second section of the channel is longer than the first section of the channel.

7. A staking tool comprising:
a body having a first surface, a second surface opposite the first surface, and a third surface between the first and second surfaces;
an extension projecting outward from the first surface of the body;
a bore extending through the body and the extension along a longitudinal axis of the staking tool, the bore having a first section with a first width at the second surface and a second section with a second width at a top surface of the extension, the second width less than the first width, the bore to receive a bolt with a head of the bolt being disposed within the first section of the bore and a threaded shaft of the bolt extending through the second section of the bore and beyond the top surface of the extension; and
one or more staking walls projecting outward from the first surface of the body and spaced around the extension, an inner diameter of the one or more staking walls coupled to an outer surface of the extension, the top surface of the extension being spaced further from the first surface of the body than a top of the one or more staking walls.

8. The staking tool of claim 7, wherein three staking walls project from the first surface of the body and are spaced at equal radial distances from each other around the extension.

9. The staking tool of claim 7, wherein the body includes a beveled surface between the third surface and the second surface.

10. The staking tool of claim 7 further including an annular groove within an inner surface of the first section of the bore, the annular groove to receive a snap ring to secure the head of the bolt within the first section.

11. The staking tool of claim 7, wherein an outer diameter of the one or more staking walls is aligned with the third surface of the body.

12. An apparatus comprising:
a staking tool including:
a body;
one or more staking ears extending outward from the body;
a channel extending through the body; and
an annular groove formed within an inner surface of the channel;
a bolt having a head and a threaded shaft; and
a snap ring to be disposed in the annular groove to engage the head of the bolt when the bolt is disposed within the channel, an inner diameter of the snap ring being smaller than an outer diameter of the head of the bolt to retain the bolt within the channel.

13. The apparatus of claim 12, wherein the body has a first side and a second side opposite the first side, and wherein the staking tool further includes an extension projecting outward from the second side of the body.

14. The apparatus of claim 13, wherein the channel extends through the body and the extension along a longitudinal axis of the staking tool between a first opening in the first side of the body and a second opening in an end surface of the extension, the channel having a first section with a first diameter and a second section with a second diameter smaller than the first diameter.

15. The apparatus of claim 14, wherein, when the bolt is disposed in the channel, the head of the bolt is disposed in the first section of the channel and the threaded shaft of the bolt is disposed in the second section of the channel and extends outward from the second opening in the end surface of the extension.

16. The apparatus of claim 14, wherein the annular groove is formed in the first section of the channel and spaced apart from the first opening of the channel on the first side of the body.

17. The apparatus of claim 14, wherein the second section of the channel is longer than the first section of the channel.

18. The apparatus of claim 13, wherein the extension has a smaller diameter than the body.

19. The apparatus of claim 18, wherein the one or more staking ears are coupled between the second side of the body and an outer surface of the extension.

20. The apparatus of claim 19, wherein the one or more staking ears are spaced at equal radial distances from each other around the extension.

* * * * *